(12) United States Patent
Yamauchi et al.

(10) Patent No.: US 6,709,259 B2
(45) Date of Patent: Mar. 23, 2004

(54) MOVABLE VACUUM FORMING APPARATUS FOR PRESSING AND VACUUM PRESS APPARATUS

(75) Inventors: Yuji Yamauchi, Tokyo (JP); Kiyotaka Fujihira, Tokyo (JP); Saburo Seki, Tokyo (JP); Nobutaka Hatori, Tokyo (JP)

(73) Assignee: Tanken Seal Seiko Co., Ltd., Tokyo (JP)

( * ) Notice: Subject to any disclaimer, the term of this patent is extended or adjusted under 35 U.S.C. 154(b) by 211 days.

(21) Appl. No.: 09/939,983

(22) Filed: Aug. 27, 2001

(65) Prior Publication Data

US 2003/0039715 A1 Feb. 27, 2003

(51) Int. Cl.$^7$ .............................................. B29C 43/56
(52) U.S. Cl. .................... 425/388; 425/405.1; 425/406; 425/DIG. 47; 425/DIG. 60
(58) Field of Search ............................. 425/405.1, 388, 425/387.1, 406, DIG. 47, DIG. 60

(56) References Cited

U.S. PATENT DOCUMENTS

| | | | | |
|---|---|---|---|---|
| 4,128,375 A | * | 12/1978 | Schubart | 425/405.2 |
| 5,496,433 A | * | 3/1996 | Miyashita et al. | 156/358 |
| 5,993,189 A | * | 11/1999 | Mueller et al. | 425/405.1 |
| 6,099,771 A | * | 8/2000 | Hudkins et al. | 264/102 |
| 6,305,925 B1 | * | 10/2001 | Cassani | 425/405.1 |

* cited by examiner

*Primary Examiner*—Robert Davis
*Assistant Examiner*—Joseph S. Del Sole
(74) *Attorney, Agent, or Firm*—Nields & Lemack

(57) ABSTRACT

The object of the invention is to provide a chamber for a heating press which can cope well with the height change of a composite material article. In a chamber for a heating press, upper and lower metal flanges 6, 7 are provided between upper and lower press heating plates 1, 2 and an intrusion part 11 is further formed in the lower metal flange. This intrusion part 11 is intruded into the upper metal flange 6 and the gap between the intrusion part 11 and the upper metal flange 6 is sealed by a packing 22 having a lip.

11 Claims, 6 Drawing Sheets

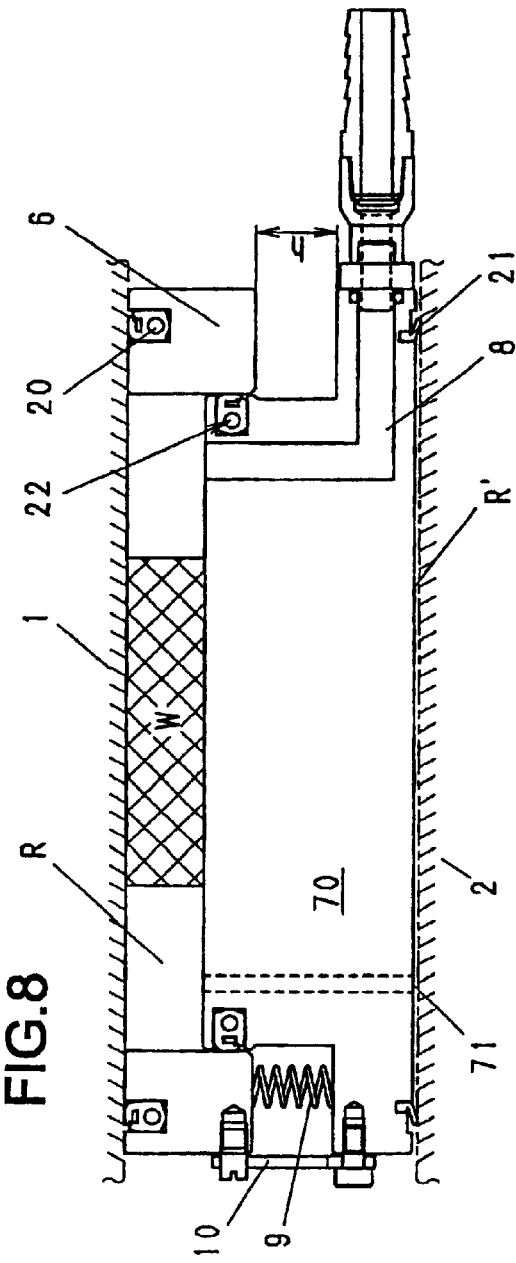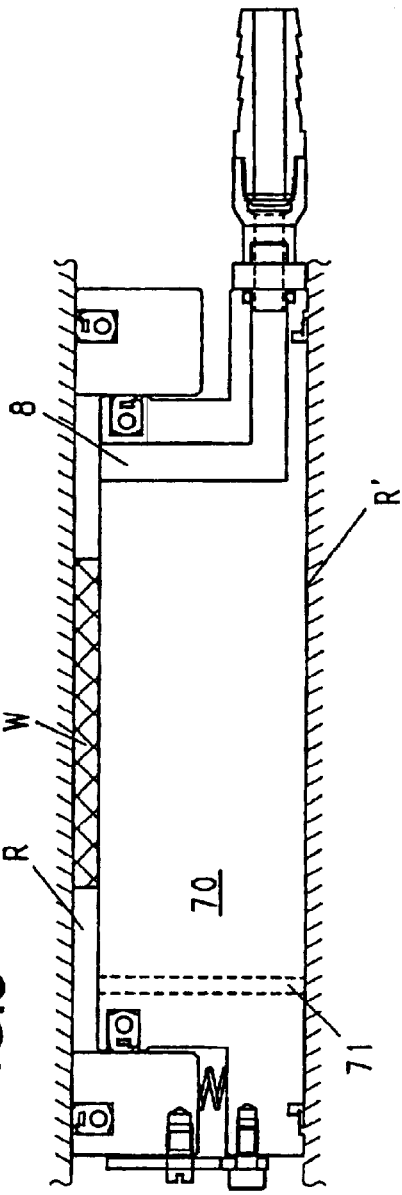

MOVABLE VACUUM FORMING APPARATUS FOR PRESSING AND VACUUM PRESS APPARATUS

BACKGROUND OF THE INVENTION AND RELATED ART STATEMENT

1. Field of the Invention

The present invention relates to a movable vacuum forming apparatus used in a press machine for molding a laminated plate, rubber or resin and capable of forming a vacuum space which can deal with a dimensional change in a pressing direction.

2. Prior Art

A press apparatus or a heated press apparatus has been conventionally used widely in laminating, press-contacting or molding plate, powder, fiber, foil or the like of organic substance, inorganic substance, metal or the like or composite materials of these or in rubber molding, resin molding or the like.

According to such a press apparatus, when it is intended to increase an adherence degree of a work or remove remaining gas bubbles, pressing needs to carry out in a vacuum state. Further, when heating is needed in laminating or molding a work, pressing in a vacuum state is similarly needed in order to increase an adherence degree or a density by preventing gas bubbles produced by heating from remaining, preventing insulation failure by remaining gas bubbles in electronic parts or the like, or preventing wiring patterns from being oxidized by oxygen in the atmosphere.

In order to achieve the above-described object, according to a conventional press apparatus, a hermetically-sealed space is formed by providing a single piece of cylindrical body between upper and lower press plates. Further, packings made of synthetic rubber are interposed between the upper and lower press plates and upper and lower ends of the cylindrical body and the packings are made to follow movement in the up and down direction by pressing and a change in a height of a fabricated composite material within a range of elasticity of rubber.

OBJECT OF THE INVENTION

However, according to such a conventional constitution, there is provided only follow-up performance within a range of elasticity of the synthetic rubber and therefore, there poses a problem that an exclusive cylindrical body having a different height must be fabricated to deal with a small difference in the height of the work or a variation in the height. Further, since the cylindrically body is directly applied with compression load of pressing, there poses a problem that deformation or destruction of the cylindrical body is liable to cause.

Further, there also is a vacuum press machine of a house type confining a total of the press apparatus in a vacuum chamber, in this case, there pose problems that the cost is high, the installation space is large, time is taken for vacuuming when the volume of the vacuum chamber is large, the maintenance is laborious, or a conventional general purpose open press machine cannot be diverted thereto.

It is an object of the invention to improve the above-described drawbacks of the conventional technology.

SUMMARY OF THE INVENTION

In order to achieve the above-described object, according to an aspect of the invention, there is provided a movable vacuum forming apparatus comprising a pair of frames provided between upper and lower press plates of a press apparatus and provided to respectives of the upper and the lower press plates via packings for surrounding a predetermined space, an interpenetrated portion provided at one of the frames and capable of being interpenetrated into other of the frames movably in an up and down direction, a seal apparatus for slidably sealing an interval between the interpenetrated portion and the other of the frames, and a sucking apparatus for bringing a space surrounded by the interpenetrated portion and the other of the frames under a negative pressure, wherein the seal apparatus seals the interval by compensating for a strain of the interpenetrated portion caused by the negative pressure of the space.

It is preferable that the seal apparatus is a packing mounted to the interpenetrated portion and brought into sliding contact with an inner periphery of the other frame and includes a lip having a size in correspondence with the strain of the interpenetrated portion. Further, the seal apparatus may be a packing mounted to a side of the other frame and brought into sliding contact with an outer periphery of the interpenetrated portion.

According to the above-described constitution, the space formed by the frames can be expanded and contracted in the up and down direction and accordingly, can follow to a height of a work. Therefore, it is not necessary to prepare frames for respective height of the work. Further, the apparatus does not directly undergo press load and therefore, deformation or destruction thereof can be prevented. Further, the apparatus can effectively correspond to the strain caused by the negative pressure of the interpenetrated portion to thereby maintain the sealing function.

Further, there are achieved advantages that the apparatus can simply be attached to a conventional general purpose open press machine, a time period required for vacuuming is short since a volume of a vacuum chamber is necessary minimum in comparison with that of a house type vacuum press machine, the cost is low and so on.

BRIEF DESCRIPTION OF THE DESCRIPTION

FIG. 8 is a schematic side sectional view for explaining still other embodiment of the invention, showing a state in which a frame and a base are expanded from each other;

FIG. 9 is a schematic side sectional view for explaining the embodiment of the invention, showing a state in which the frame and the base are compressed to each other.

DETAILED DESCRIPTION OF PREFERRED EMBODIMENTS

Figure 1:
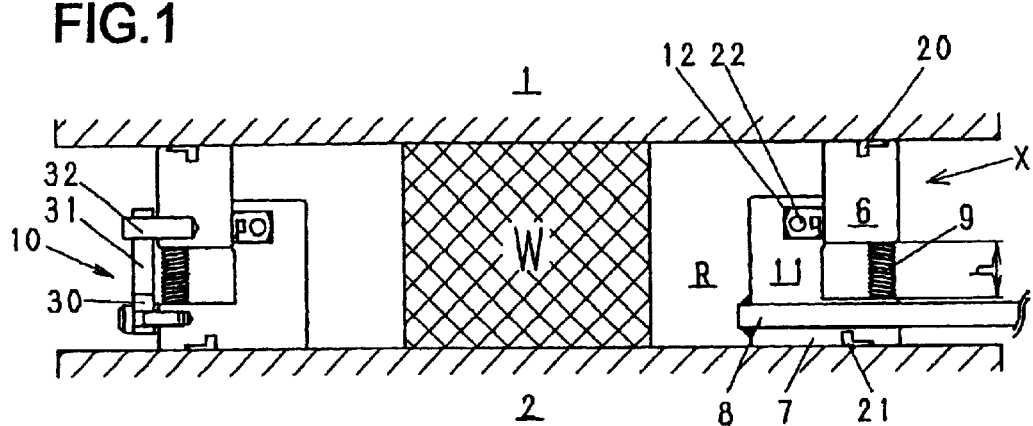
FIG. 1 is a schematic side sectional view for explaining an embodiment of the invention, showing a state in which a pair of frames are expanded from each other.
Figure 2:
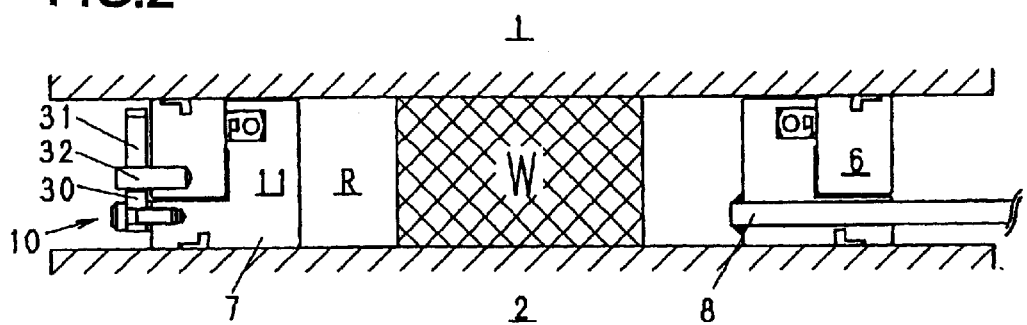
FIG. 2 is a schematic side sectional view for explaining the embodiment of the invention, showing a state in which the pair of frames are compressed to each other.

An explanation will be given as follows of an embodiment of the invention in reference to the drawings.

Embodiment 1

FIG. 1, FIG. 2, FIG. 3 and FIG. 4 show an embodiment of the invention.

A shape of a movable vacuum forming apparatus X according to the invention is constituted by a quadrangular shape in conformity with a shape of a work W to thereby promote a space efficiency. The space can be a round shape or other shape when there is allowance in an area of a press plate.

According to the embodiment, an upper frame 6 and a lower frame 7 are provided between an upper press plate 1 and a lower press plate 2 and the work W is enclosed at inside of a hermetically-sealed space R formed thereby. The upper frame 6 and the lower frame 7 are formed by a square shape, an interval between the upper frame 6 and the upper press plate 1 are sealed by a packing 20 and an interval between the lower frame 7 and the lower press plate 2 is similarly sealed by a packing 21.

An upper end side of the lower frame 7 is integrally formed with an interpenetrated portion 11 having a small outer diameter and the portion of the interpenetrated portion 11 is constituted to interpenetrate inside of the upper frame 6.

A packing 22 in a ring-like shape is mounted between an outer periphery of the interpenetrated portion 11 and an inner peripheral face of the upper frame 6 to thereby constitute to seal an interval between the interpenetrated portion 11 and the upper frame 6.

Further, numeral 9 designates a spring for pressing the upper and the lower frames 6 and 7 respectively to the upper and the lower press plates 1 and 2.

The upper frame 6 and the lower frame 7 are connected movably in the up and down direction by a set plate 10 and a maximum height is restricted thereby.

Figure 4:
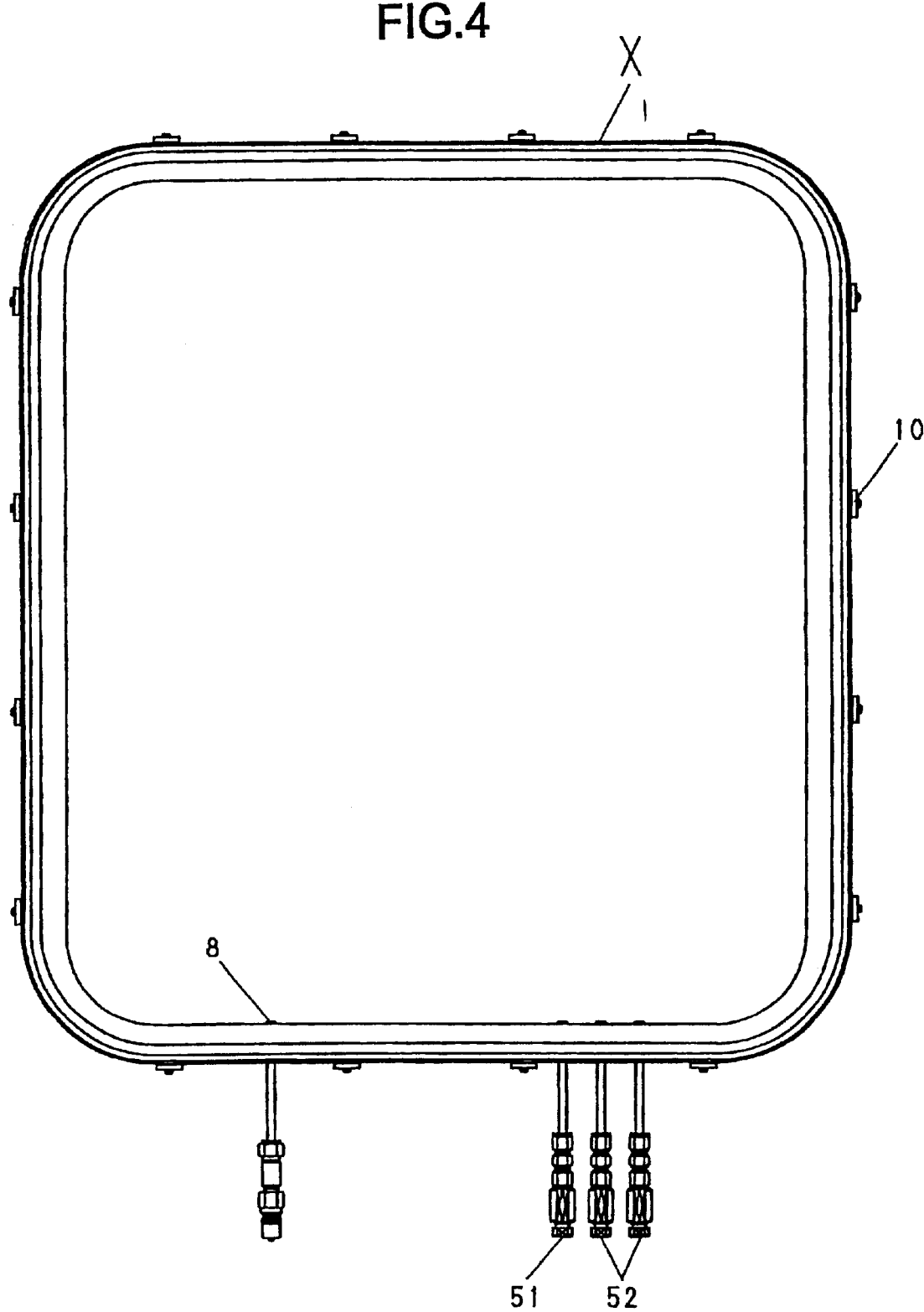
FIG. 4 is a plane view of an outlook of the embodiment of the invention.

As shown by FIG. 4, a plurality of the set plates 10 are provided in the peripheral direction and integrate the upper frame 6 and the lower frame 7.

The set plate 10 is constituted by a plate 30 mounted to the lower frame 7 and a pin 32 fixed to a side of the upper frame 6. The plate 30 is formed with a long hole 31 with which the pin 32 is engaged and the upper frame 6 and the lower frame 7 are integrated movably in the up and down direction by a movable amount h.

By the above-described constitution, the movable vacuum forming apparatus X can be handled integrally as a single body.

As described above, the hermetically-sealed space R at inside of the movable vacuum forming apparatus X is brought into a vacuum state and at that occasion, strain may be caused at the interpenetrated portion 11 in an inner side direction by the atmospheric pressure. Particularly, when the movable vacuum forming apparatus X is in the quadrangular shape, the strain is enlarged at a vicinity of a central portion of a side of a straight line. There is a danger of constituting sealing failure by opening a clearance between the interpenetrated portion 11 and the upper frame 6 by the strain of the interpenetrated portion 11.

Therefore, according to the invention, the packing 22 is provided with a function of compensating for the strain.

Figure 3:
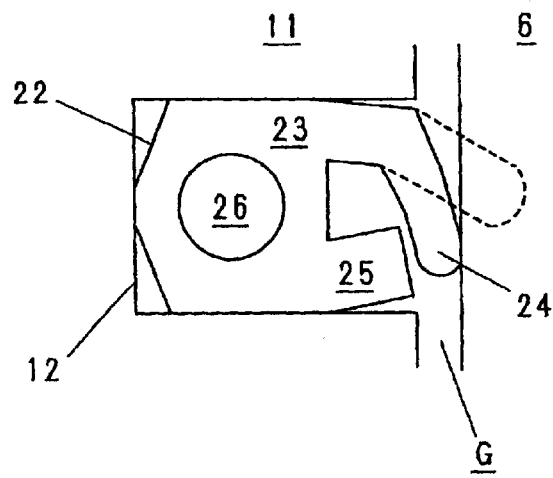
FIG. 3 is an enlarged side view of a packing 22 according to the embodiment of the invention.

That is, as shown by FIG. 3, the packing 22 in the ring-like shape is constituted by a main body 23 in a ring-like shape and a lip 24 in a ring-like shape. The main body 23 is fitted to a groove 12 formed in the interpenetrated portion 11 and the lip 24 is projected from the main body 23 in a direction of the inner peripheral face of the upper frame 6 and is brought into contact with the inner peripheral face of the upper frame 6 to thereby seal the clearance.

Further, the packing 22 may be mounted to the side of the upper frame 6 to thereby bring the lip 24 in contact with an outer peripheral side of the interpenetrated portion 11 and seal the clearance.

The lip 24 is constituted by a flexible material and is provided with a length to sufficiently be brought into contact with the upper frame 6 and seal the clearance even when the clearance G between the upper frame 6 and the interpenetrated portion 11 is opened. Further, as shown by FIG. 3, the lip 24 is inclined to a lower side and is pressed to the inner peripheral face of the upper frame 6 by pressure from the side of the atmosphere in addition to the flexibility to thereby achieve high sealing performance. Dotted lines in the drawing indicate a position of the lip 24 in a natural state, the lip 24 is flexed by being brought into contact with the inner peripheral face of the upper frame 6, adhered to the inner peripheral face of the upper frame 6 and at the same time, pressed to the inner peripheral face of the upper frame 6 by the atmospheric pressure.

A short lip 25 in a ring-like shape is provided to prevent the lip 24 from not being brought into contact with the inner peripheral face of the upper frame 6 by entering the groove 12. Further, a cavity portion 26 is formed in a ring-like shape at a vicinity of a center of the packing 22 to thereby provide elasticity and facilitate insertion of the packing 22 into the groove 12.

Further, the main body 23 is formed by a square shape to thereby prevent twist or the like even when the lip 24 undergoes pressure or friction.

According to the above-described constitution of the packing 22, even when inside of the movable vacuum forming apparatus X is brought into the vacuum state, strain is caused at the interpenetrated portion 11 and the clearance G is enlarged, contact of the lip 24 with the upper frame 6 is not interrupted and the excellent sealing state is continued.

Further, in FIG. 1, the lower frame 7 is provided with a suction hole 8 to thereby bring the inside of the apparatus into the vacuum state. Further, nozzles may be provided for measuring pressure and temperature and in order to connect the nozzles, as shown by FIG. 4, a pressure meter hole 51, a thermocouple hole 52 and the like are provided.

Further, in place of the packings 20 and 21, the packings such as 0 rings or the like can also be used.

According to the above-described constitution, the upper frame 6 and the lower frame 7 are made of metal and are movable in the up and down direction in the range of the movable amount h and therefore, can follow a change in the height of the work W. The movable range can be made an arbitrary magnitude by changing the height of the interpenetrated portion 11 or the height of the upper frame 6 and by previously estimating the necessary movable range in correspondence with the change in the height, there is achieved an effect capable of dealing with the change of the height of the work W without replacing the upper frame 6 and the lower frame 7.

Further, even when the inside of the movable vacuum forming apparatus X is brought into the vacuum state and the strain is caused in the interpenetrated portion 11, the lip 24 of the packing 22 pertinently follows thereto and maintains to seal between the lip 24 and the upper frame 6 and therefore, the excellent sealing performance can be maintained.

Embodiment 2

Figure 5:
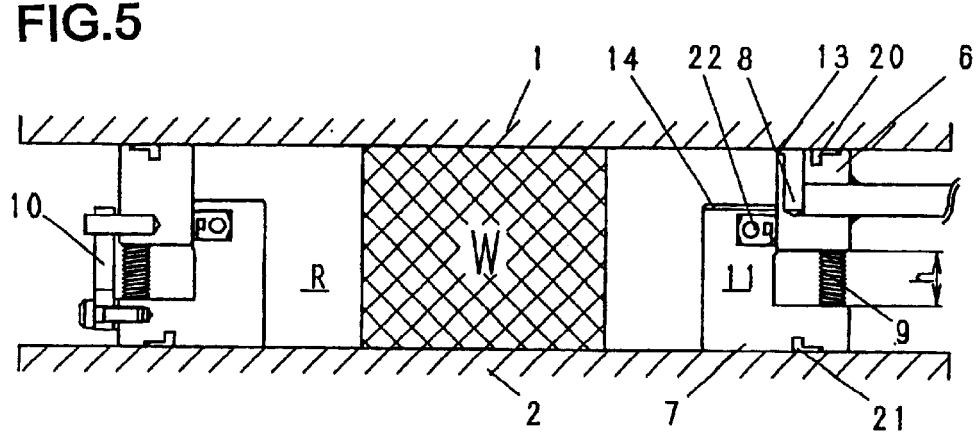
FIG. 5 is a schematic sectional view for explaining other embodiment of the invention, showing a state in which a pair of frames are expanded from each other.
Figure 6:
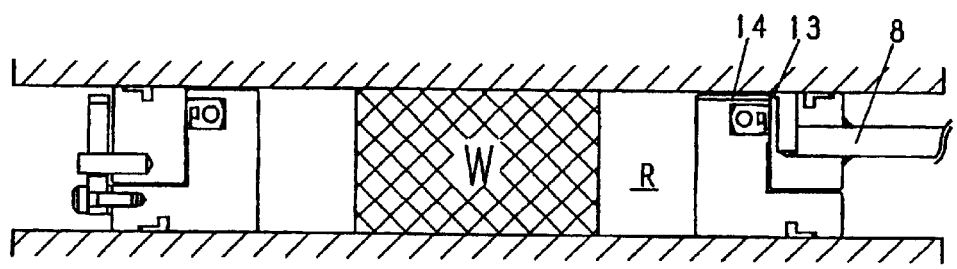
FIG. 6 is a schematic side sectional view for explaining the embodiment of the invention, showing a state in which the pair of frames are compressed to each other.
Figure 7:
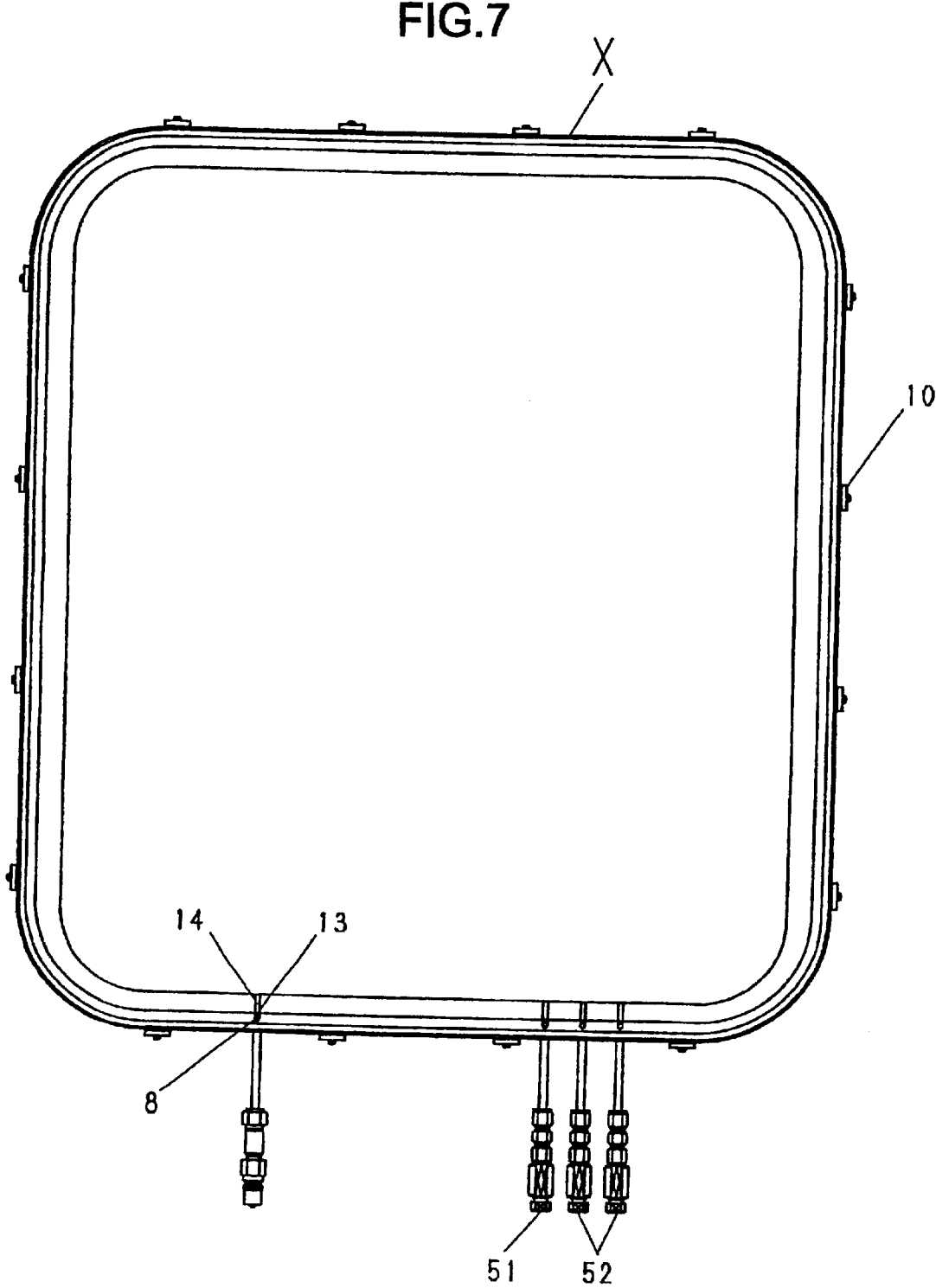
FIG. 7 is a plane view of an outlook of the embodiment of the invention.

FIG. 5, FIG. 6 and FIG. 7 show other embodiment of the invention. Although the basic constitution is similar to that of Embodiment 1, according to the embodiment, the suction hole 8 is provided to the upper frame 6.

When the suction hole 8 is provided on the side of the upper frame 6, as shown by FIG. 6, the suction hole 8 is closed by the interpenetrated portion 11 in the compressing operation. Therefore, the suction hole 8 is constituted by an L-like shape as illustrated and is made to communicate with a notched groove 13 formed at an upper face of the upper frame 6. Meanwhile, an upper face of the interpenetrated portion 11 is also formed with a notched groove 14 for connecting to the notched groove 13 to thereby construct a constitution in which the hermetically-sealed space R is vacuumed from the suction hole 8 by way of the notched groove 13 and the notched groove 14.

Further, by constituting the suction hole 8 in the L-like shape, the total height of the movable vacuum forming apparatus X can be lowered, which is effective when a distance between the upper and the lower press plates is short.

Embodiment 3

Figure 10:
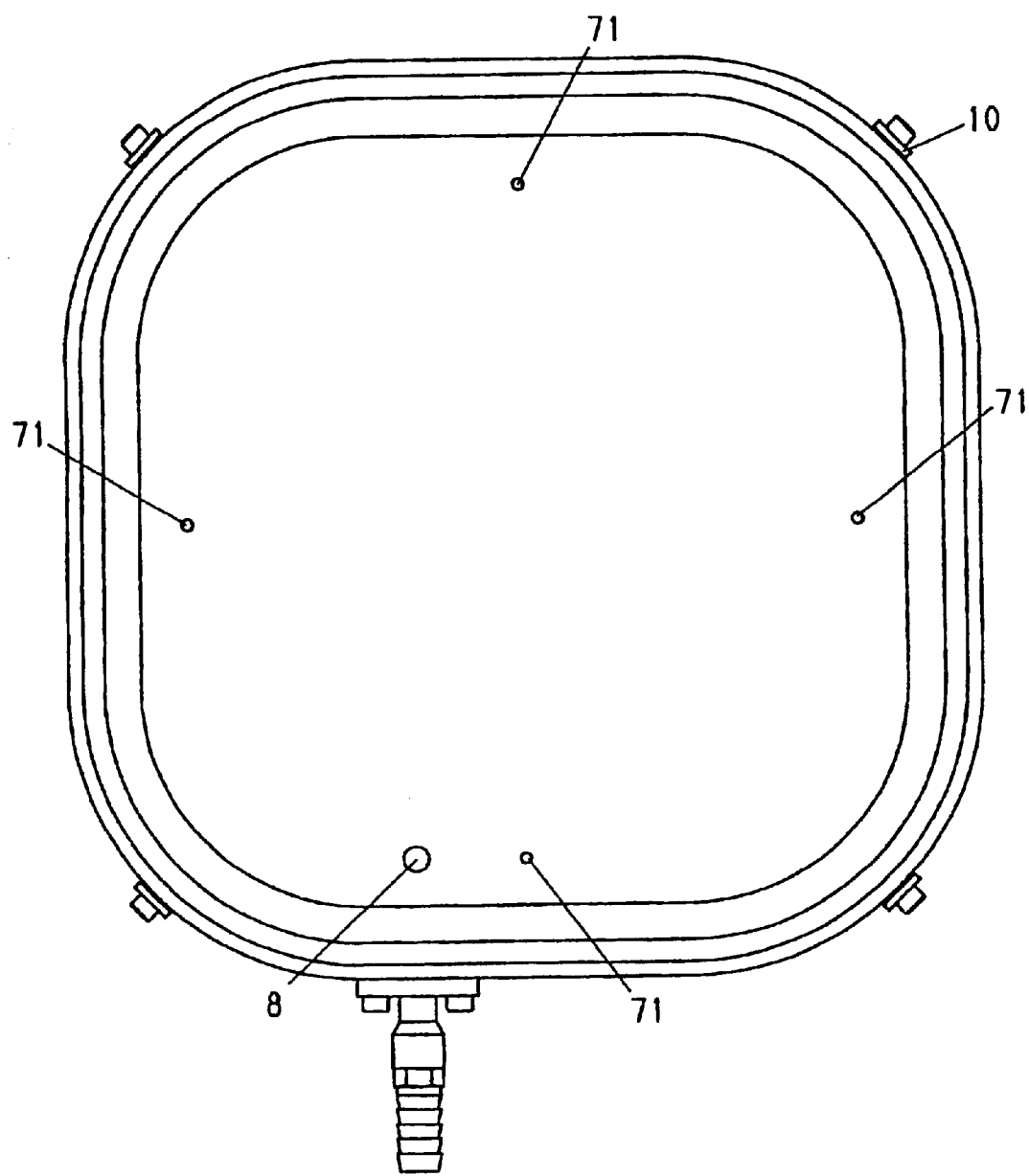
FIG. 10 is a plane view of an outlook of the embodiment of the invention.

FIG. 8, FIG. 9 and FIG. 10 show still other embodiment.

According to the embodiment, there is used a base 70 which is not constituted by a shape of a frame in place of the lower frame 7.

Thereby, a height adjusting plate is not put into the hermetically-sealed space R and even when a thickness of the work W is unlimitedly proximate to 0 mm as in pasting or laminating a film, vacuum pressing can be carried out. Further, in this example, the hole 8 is provided to the base 70 in an L-like sectional shape.

The base 70 is provided with the packing 21 at a bottom face thereof to thereby seal an interval between the base 70 and the lower press plate 2. Further, the base 70 is formed with a balance hole 71 to communicate the hermetically-sealed space R and a hermetically-sealed space R' formed on the bottom face side. This is for preventing the base 70 from being attracted to the upper frame 6 by the hermetically-sealed space R formed in the movable vacuum forming apparatus X. The hermetically-sealed spaces R and R' are connected by the balance hole 71 and therefore, the same pressure is constituted and the movable vacuum forming apparatus X can be prevented from being automatically contracted by a difference between the pressure and the atmospheric pressure by vacuuming the hermetically-sealed space R to thereby adsorb the base 70 to the upper frame 6.

When it is permitted that the apparatus is automatically contracted and adsorbed to the upper frame 6, there can be constructed a structure which is not provided with the balance hole 71.

Further, in place of the packings 20 and 21, packings having other shape such as O rings or the like can also be used.

According to the above-described constitution, there are achieved an effect similar to that of Embodiment 1 and an effect of capable of dealing with a work having a thin thickness.

Further, any of the movable vacuum forming apparatus X in the embodiments 1, 2 and 3 can be used by constituting multiple stages thereof by building up the apparatus by interposing plates or the like thereamong. Further, in the case of embodiments 1 and 2, the apparatus X can be used by laminating the apparatus without interposing plates thereamong to thereby deal with a work having a large height.

As has been explained above, according to the movable vacuum forming apparatus for pressing of the invention, the apparatus can follow the change in the height of the work and it is not necessary to provide frames for respective different heights as in the conventional technology. Further, the frame or the spring is not deformed or destructed by compression load. Further, there is achieved an effect of promoting the sealing performance and enabling to prevent occurrence of failure or the like caused by oxidation which has been caused conventionally.

Further, there are achieved advantages that the apparatus can simply be attached to a conventional general purpose open press machine, a time period required for vacuuming or heating is short since the volume of the vacuum chamber is necessary minimum in comparison with that of the house type vacuum press machine, the cost is low and so on.

What is claimed is:

1. A movable vacuum forming apparatus comprising: a pair of frames provided respectively to upper and lower press plates of a press apparatus via seals for surrounding a predetermined space; an interpenetrated portion provided at one of the frames and capable of being interpenetrated into other of the frames movably in an up and down direction; a seal apparatus for slidably sealing an interval between the interpenetrated portion and the other of the frames; and a sucking apparatus for bringing a space surrounded by the interpenetrated portion and the other of the frames under a negative pressure, wherein the seal apparatus has a main body with a flexible lip projected therefrom that seals the interval by compensating for a strain of the interpenetrated portion caused by the negative pressure of the space.

2. The movable vacuum forming apparatus according to claim 1, wherein; the seal apparatus is a packing mounted to the interpenetrated portion for being brought into sliding contact with an inner periphery of the other of the frames.

3. The movable vacuum forming apparatus according to claim 1, wherein; the seal apparatus is a packing mounted to the other of the frames and brought into sliding contact with an outer periphery of the interpenetrated portion.

4. The movable vacuum forming apparatus according to claim 1, further comprising a connecting piece for connecting the pair of frames movably in the up and down direction by a predetermined length to thereby integrate the pair of frames.

5. The movable vacuum forming apparatus according to claim 1, wherein;

the other of the frames provided with the interpenetrated portion includes an uninterpenetrated portion which is not interpenetrated into the one of the frames and the suction apparatus vacuums the surrounded space via the uninterpenetrated portion.

6. The movable vacuum forming apparatus according to claim 1, further comprising:

a hole provided at the one of the frames and connected to the suction apparatus;

a first notched groove formed at an upper face of the one of the frames and communicated with the hole; and a second notched groove formed at an upper face of the interpenetrated portion and communicated with the first notched groove, wherein the suction apparatus vacuums the surrounded space via the first notched groove and the second notched groove.

7. A movable vacuum forming apparatus comprising: one frame provided between upper and lower press plates of a press apparatus for surrounding a predetermined space provided at the upper press plate via a seal; a base provided at the lower press plate via a seal and having an interpenetrated portion capable of being interpenetrated to the one frame movably in an up and down direction; a seal apparatus for slidably sealing an interval between the interpenetrated portion of the base and the one frame; and a suction apparatus for bringing a space formed by the interpenetrated portion and the one frame and the upper and the lower press plates under a negative pressure, wherein the seal apparatus has a main body with a flexible lip projected therefrom that seals the interval by compensating for strain of the interpenetrated portion caused by the negative pressure of the space.

8. The movable vacuum forming apparatus according to claim 7, wherein;
the base includes a pressure balance hole for communicating the surrounded space and the space formed between the base and the lower press plate.

9. A vacuum press apparatus comprising: upper and lower press plates moved in an up and down direction by a predetermined drive apparatus; one frame attachably and detachably provided between the upper and the lower press plates for surrounding a predetermined space provided at one of the upper and the lower press plates via seal; a member provided between the upper and the lower press plates, provided at the other of the upper and the lower press plates via a seal and having an interpenetrated portion capable of being interpenetrated to the one frame movably in the up and down direction; and a seal apparatus for slidably sealing an interval between the interpenetrated portion of member and the one frame; and a suction apparatus for bringing a space surrounded by the interpenetrated portion and the one frame under a negative pressure, wherein the seal apparatus has a main body with a flexible lip projected therefrom that seals the interval by compensating for strain of the interpenetrated portion caused by the negative pressure of the space.

10. The vacuum press apparatus according to claim 9, wherein the member is a frame.

11. The vacuum press apparatus according to claim 9, wherein the member is a base.

* * * * *